United States Patent
Fontaine et al.

(12)

(10) Patent No.: US 6,260,716 B1
(45) Date of Patent: Jul. 17, 2001

(54) SCUM SWEEPER FOR SURFACE FLOATING MATTERS IN A CLARIFYING TANK

(75) Inventors: Henri Fontaine, Magog; Erick Breton, North Hatley, both of (CA)

(73) Assignee: H. Fontaine Ltee, Magog (CA)

( * ) Notice: Subject to any disclaimer, the term of this patent is extended or adjusted under 35 U.S.C. 154(b) by 0 days.

(21) Appl. No.: 09/609,187

(22) Filed: Jun. 30, 2000

(30) Foreign Application Priority Data

Oct. 12, 1999 (CA) .................................................. 2285809

(51) Int. Cl.[7] .................................................. B01D 21/18
(52) U.S. Cl. .................. 210/525; 210/526; 210/540; 210/541; 198/729; 198/732
(58) Field of Search .................. 210/525, 526, 210/540, 541, 542; 198/728, 729, 732

(56) References Cited

U.S. PATENT DOCUMENTS

| Re. 35,668 | 11/1997 | Albertson | 210/803 |
|---|---|---|---|
| 2,067,277 | * 1/1937 | Miick | 210/525 |
| 2,096,409 | * 10/1937 | Sayers | 210/526 |
| 3,015,396 | * 1/1962 | Qunst | 210/525 |
| 3,015,621 | * 1/1962 | Qunst | 210/525 |
| 3,063,938 | * 11/1962 | Katz | 210/526 |
| 3,204,773 | * 9/1965 | Lind | 210/525 |
| 3,831,767 | 8/1974 | Lefur et al. | 210/526 |
| 3,872,017 | 3/1975 | Bishop | 210/525 |
| 4,054,520 | 10/1977 | McGivern | 210/122 |
| 4,470,905 | 9/1984 | Pangburn et al. | 210/136 |
| 4,514,303 | 4/1985 | Moore | 210/519 |
| 4,880,533 | 11/1989 | Hondulas | 210/104 |
| 5,015,393 | 5/1991 | Russell et al. | 210/744 |
| 5,035,681 | 7/1991 | Hertel et al. | 474/152 |
| 5,047,151 | 9/1991 | Brandkvist | 210/525 |
| 5,057,219 | 10/1991 | Fujiwara | 210/525 |
| 5,165,522 | 11/1992 | Uttke et al. | 198/716 |
| 5,242,600 | 9/1993 | Meylor et al. | 210/703 |
| 5,250,178 | 10/1993 | Casper et al. | 210/256 |
| 5,268,099 | 12/1993 | Krofta et al. | 210/221.2 |
| 5,269,928 | 12/1993 | Leikam | 210/525 |
| 5,336,417 | 8/1994 | Hannum | 210/803 |
| 5,454,942 | 10/1995 | Ljungberg | 210/221.2 |
| 5,501,318 | * 3/1996 | Disrud | 198/732 |
| 5,538,631 | 7/1996 | Yeh | 210/221.2 |
| 5,545,324 | 8/1996 | Workman | 210/525 |
| 5,565,099 | 10/1996 | Fauret et al. | 210/221.2 |
| 5,728,304 | 3/1998 | Yeh | 210/703 |
| 5,788,837 | 8/1998 | Hannum | 210/145 |
| 5,948,277 | 9/1999 | Frankenberger | 210/776 |
| 5,968,353 | 10/1999 | Herbert et al. | 210/221.3 |
| 6,017,180 | 1/2000 | Wilham | 414/305 |

* cited by examiner

Primary Examiner—Christopher Upton
(74) Attorney, Agent, or Firm—Altera Law Group, LLC

(57) ABSTRACT

A scum sweeper for sweeping surface floating matters in a clarifying tank to a collector channel. A sweeping blade is pivotally hanged by arms to parallel endless running chains mounted onto a supporting frame installed in the tank at an above position with respect to the collector channel. A motor drives the chains that haul the blade back and forth successively over and at the surface of water in the tank. The blade always remains under the chains as a result of a free pivoting of the arms at the opposite turning end courses of the chains. Guiding arrangements are provided to lock the arms in a downward direction when the sweeping blade travels horizontally.

17 Claims, 7 Drawing Sheets

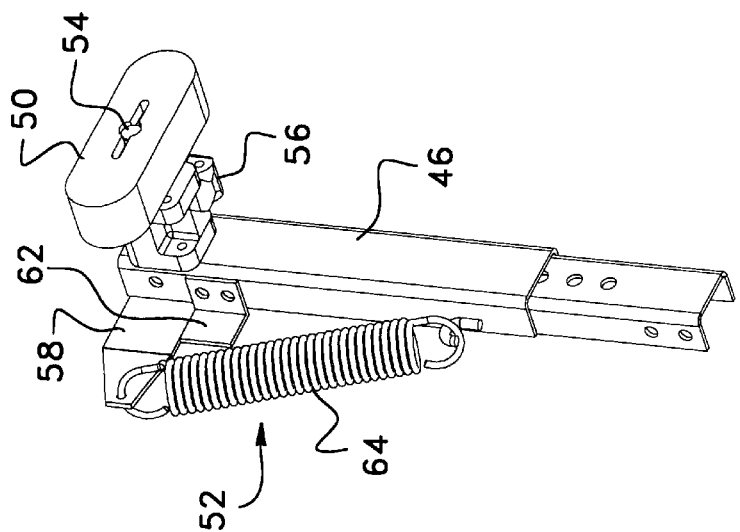
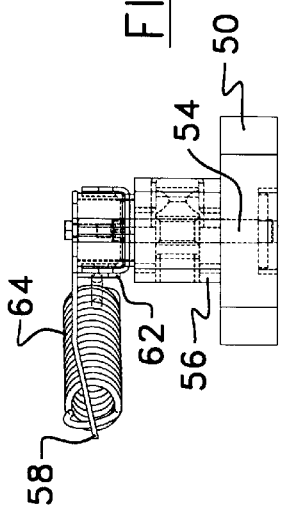
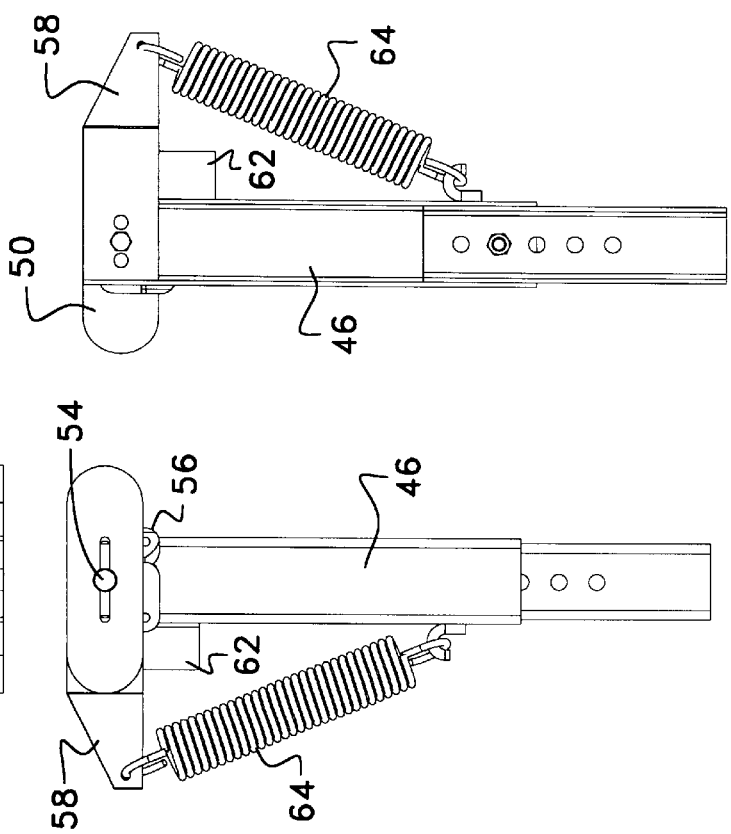
FIG. 7
FIG. 8
FIG. 9
FIG. 10

SCUM SWEEPER FOR SURFACE FLOATING MATTERS IN A CLARIFYING TANK

FIELD OF THE INVENTION

The present invention generally relates to the removing operation of scum, sludge or other matters floating at the surface of water, waste water, sewage or the like in a clarifying tank, and more particularly to a scum sweeper used for performing such an operation, and a system using such a scum sweeper to sweep surface floating matters into a collector channel or pipe in a clarifying tank.

BACKGROUND

Systems for collecting surface floating matters in a clarifying tank generally operate in a scrapper-like fashion to bring floating matters close to collector channels and to bring heavy waste matters laying at the bottom of the tank into a collector drain. The mechanisms used for this purpose usually have an important drawback in that they stop on the surface at around 1.5 m (5 feet) from the collector channels, thereby leaving a dead zone where the floating matters aggregate to form a crust. The systems proposed to cure the aforesaid mechanisms of this problem are generally complex, with many partially or totally immerged mechanical components due to the limited space in which these systems are installed.

Known in the art are U.S. Pat. Nos. 3,831,767 (Lefur et al.); U.S. Pat. No. 3,872,017 (Bishop); U.S. Pat. No. 4,054,520 (McGivern); U.S. Pat. No. 4,470,905 (Pangburn et al.); U.S. Pat. No. 4,514,303 (Moore); U.S. Pat. No. 4,880,533 (Hondulas); U.S. Pat. No. 5,015,393 (Russell et al.); U.S. Pat. No. 5,035,681 (Hertel et al.); U.S. Pat. No. 5,047,151 (Brandkvist); U.S. Pat. No. 5,057,219 (Fujiwara); U.S. Pat. No. 5,165,522 (Uttke et al.); U.S. Pat. No. 5,242,600 (Meylor et al.); U.S. Pat. No. 5,250,178 (Casper et al.); U.S. Pat. No. 5,268,099 (Krofta et al.); U.S. Pat. No. 5,269,928 (Leikam); U.S. Pat. No. 5,336,417 (Hannum); U.S. Pat. No. 5,454,942 (Ljungberg); U.S. Pat. No. 5,538,631 (Yeh); U.S. Pat. No. 5,545,324 (Workman); U.S. Pat. No. 5,565,099 (Fauret et al.); Re. U.S. Pat. No. 35,668 (Albertson); U.S. Pat. No. 5,728,304 (Yeh); U.S. Pat. No. 5,788,837 (Hannum); U.S. Pat. No. 5,948,277 (Frankenberger); U.S. Pat. No. 5,968,353 (Herbert et al.); and U.S. Pat. No. 6,017,180 (Wilham); which show various sewage treatment devices and systems illustrating the state of the art.

SUMMARY

An object of the invention is to provide a scum sweeper for sweeping surface floating matters in a clarifying tank and forcing them to discharge into a collector channel.

Another object of the invention is to provide such a scum sweeper, which is simple in construction thus highly cost-competitive, yet is highly reliable and efficient.

Another object of the invention is to provide such a scum sweeper, which is compact, and may be hanged over the water level inside the clarifying tank.

Another object of the invention is to provide such a scum sweeper, in which only the sweeping blade touches the surface of the water in the tank.

Another object of the invention is to provide such a scum sweeper, which is easily adjustable and adaptable to variable dimensions of old clarifying tanks.

Another object of the invention is to provide such a scum sweeper, in which the motor is integrated to the supporting structure so that the sweeping blade may have the desired length.

Another object of the invention is to provide such a scum sweeper, which has a low power consumption and requires only a low maintenance.

Another object of the invention is to provide such a scum sweeper, which can be installed to operate on the dead zone of an existing sweeper system.

Another object of the invention is to provide a system which is equipped with such a scum sweeper.

According to the present invention, there is provided a scum sweeper for sweeping surface floating matters in a clarifying tank to a collector channel, having a supporting frame provided with mounting brackets for installation of the supporting frame in the clarifying tank at an above position with respect to the collector channel. A pair of endless chains are attached to the supporting frame in parallel with and spaced from each other. The chains extend substantially crosswise to the collector channel and define lower and upper running courses between opposite turning end courses when the supporting frame is installed in the clarifying tank. A motor unit is attached to the supporting frame and operatively coupled to the chains in a driving engagement therewith. A pair of arms are used to hang an elongated sweeping blade under the chains with the blade extending substantially crosswise to the chains. The arms have lower ends attached to the blade, and upper ends pivotally attached respectively to the chains at substantially similar positions therealong. The arms have a length exceeding a space between the lower and upper running courses. A guiding device locks the arms in a downward direction with respect to the chains when the arms travel along the lower running course thereof, whereby the blade always remains under the chains as a result of a free pivoting of the arms at the opposite turning end courses.

Preferably, an additional guiding device is provided to lock the arms in the downward direction when the arms also travel along the upper running course of the chains.

According to the invention, there is also provided a scum sweeping system having a clarifying tank, a collector channel extending in the clarifying tank at a predetermined level therein and having an elongated longitudinal upper opening, and a scum sweeper as described above, installed in the tank with one of the turning end courses of the chains extending above the collector channel so that the sweeping blade reaches the collector channel during its displacement.

BRIEF DESCRIPTION OF THE DRAWINGS

A detailed description of preferred embodiments will be given herein below with reference to the following drawings, in which like numbers refer to like elements:

FIGS. 7, 8, 9 and 10 are respectively a top view, a side elevation view, an opposite side elevation view and a perspective view of an arm and guiding shoe assembly of a scum sweeper according to the invention.

DETAILED DESCRIPTION OF THE PREFERRED EMBODIMENTS

Figure 1:
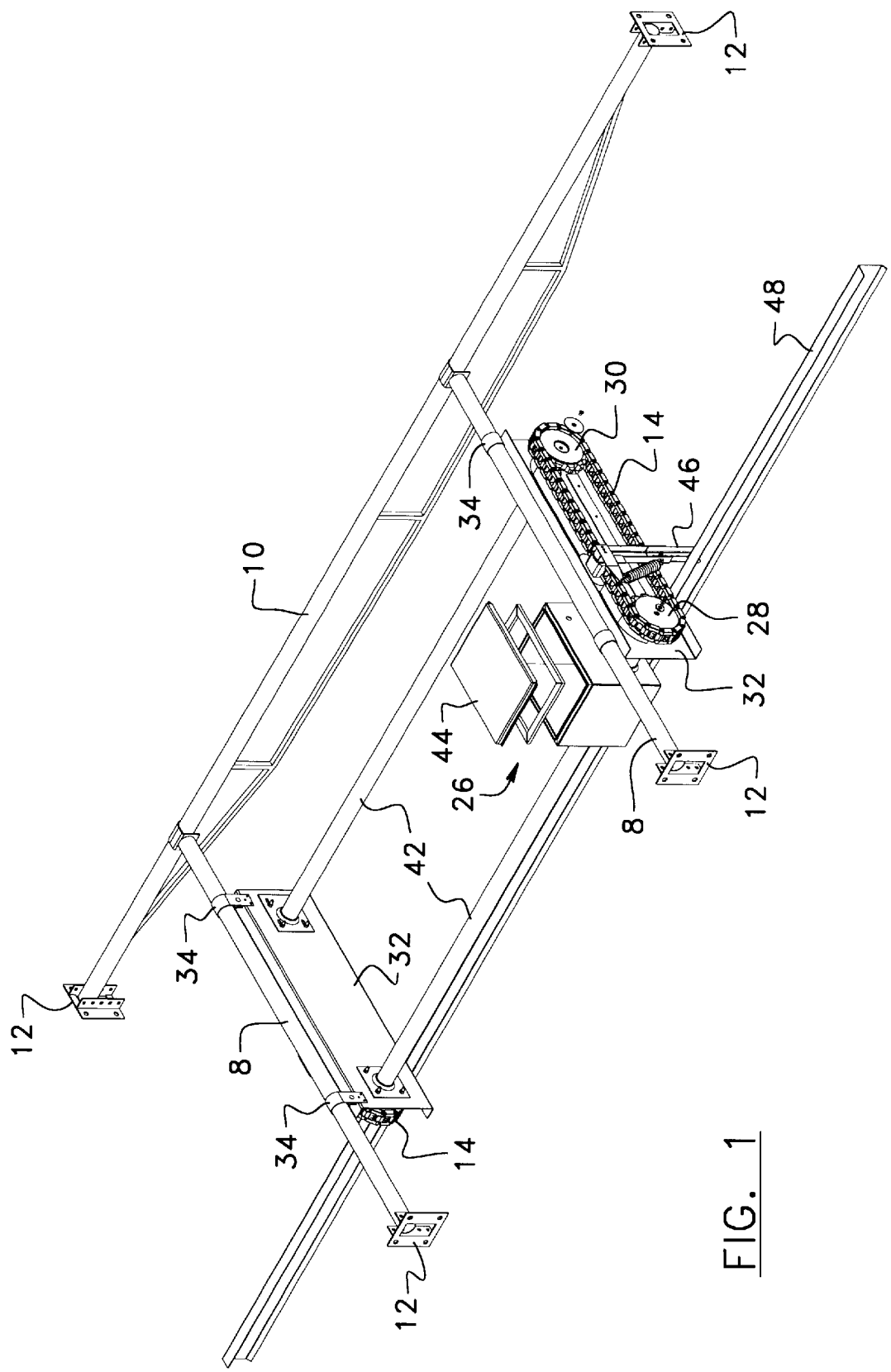
FIG. 1 is a perspective view of a scum sweeper according to the invention.
Figure 2:
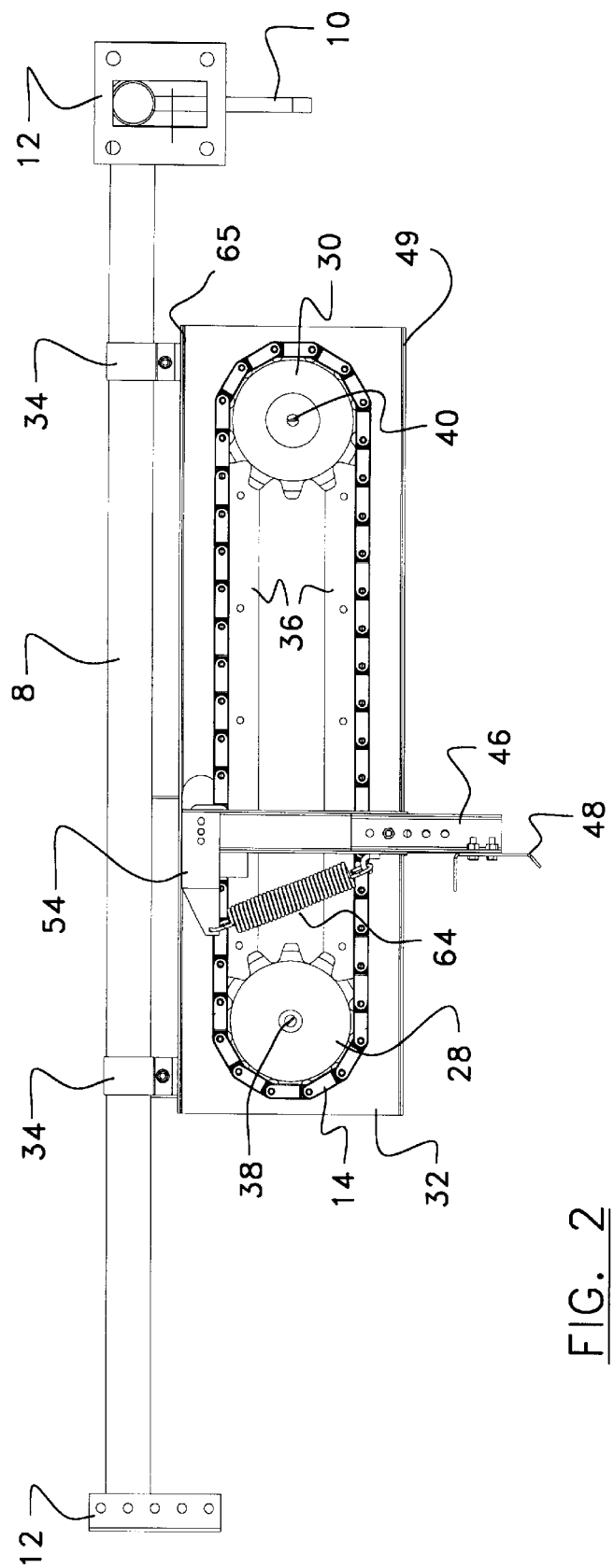
FIG. 2 is a side elevation view of a scum sweeper according to the invention.
Figure 4:
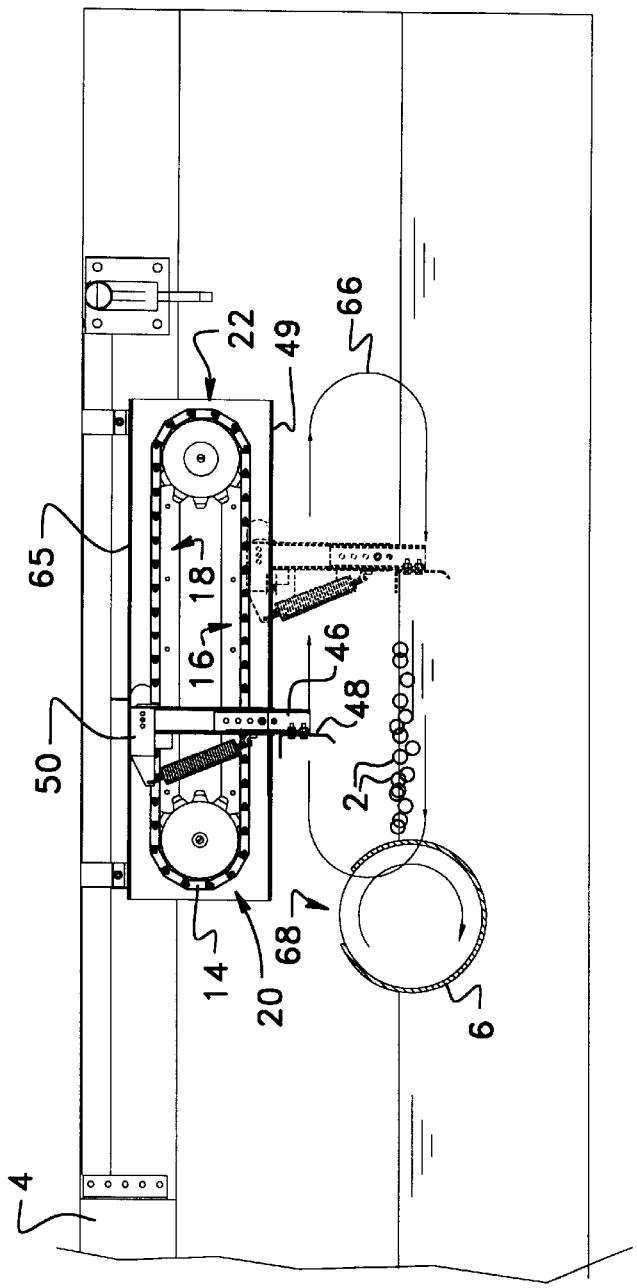
FIG. 4 is a side elevation view illustrating operation of a scum sweeper according to the invention, with a revolving collector channel.
Figure 5:
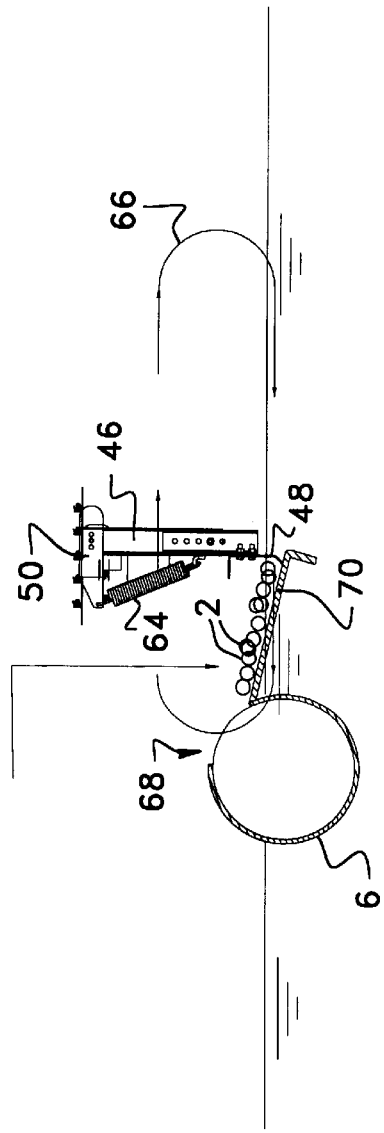
FIG. 5 is a partial side elevation view illustrating operation of a scum sweeper according to the invention, with a collector channel having a ramp.
Figure 11:
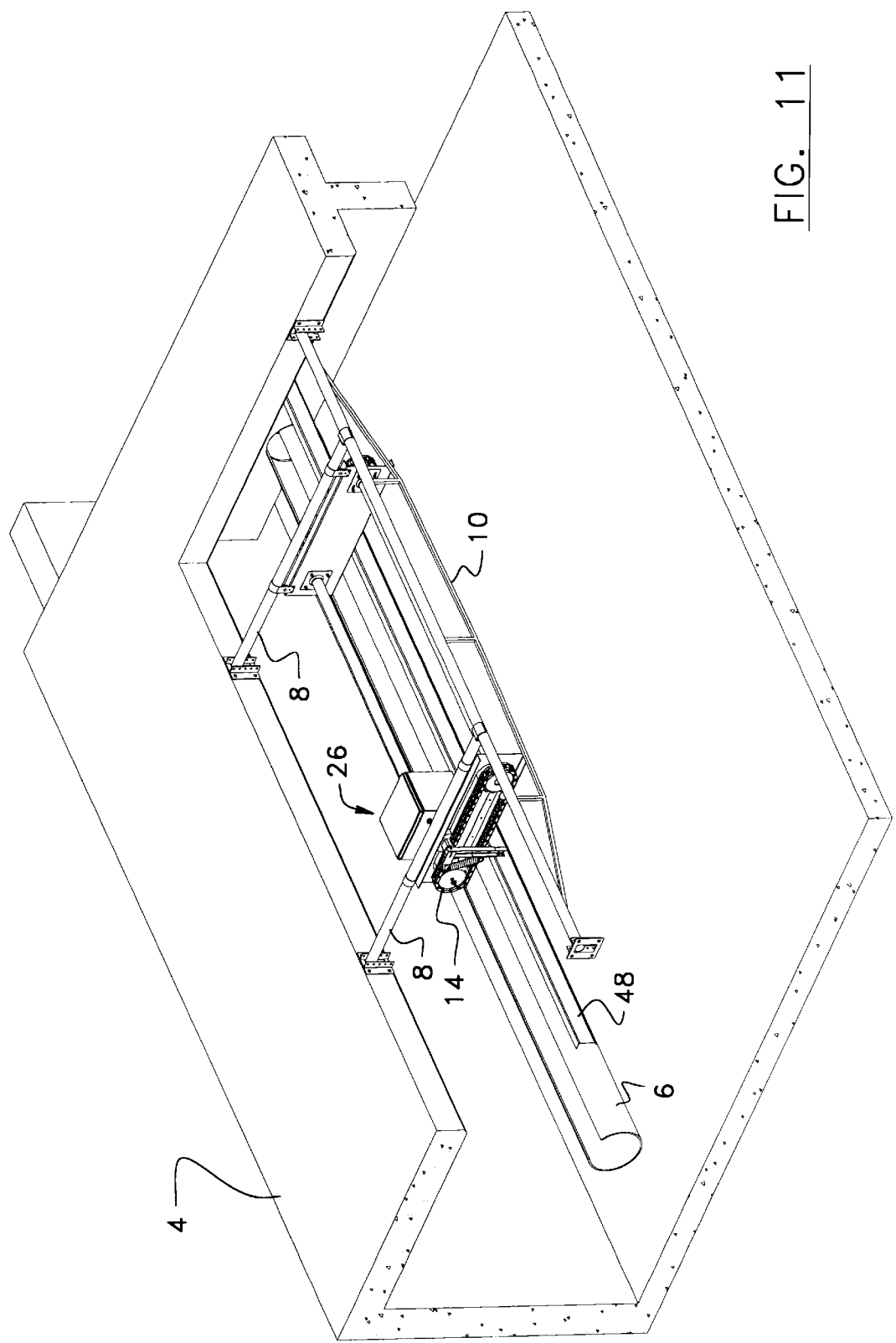
FIG. 11 is a perspective view illustrating a scum sweeping system according to the invention.

Referring to FIG. 1, there is shown a scum sweeper according to the invention, for sweeping surface floating matters 2 (as shown in FIGS. 4 and 5) in a clarifying tank 4 to a collector channel 6 (as shown in FIGS. 4 and 11).

The scum sweeper has a supporting frame that can be made of a pair of elongated structural members 8 and a structural beam member 10 extending crosswise at an end of the structural members 8, provided with mounting brackets 12 for installation of the supporting frame in the clarifying tank 4 at an above position with respect to the collector channel as best shown in FIG. 11. The supporting frame can take other configurations depending on the type of supporting structure which is best adapted to the structure of the clarifying tank 4, so long as it provides a sufficiently strong support that may extend over the water level in the clarifying tank 4. For example, it can be made of a single metallic piece instead of several pieces fitting with one another as in the illustrated case.

A pair of endless chains 14 are attached to the supporting frame in parallel with and spaced from each other. The chains 14 extend crosswise (or almost crosswise) to the collector channel 6 and define lower and upper opposite running courses 16, 18 between opposite turning end courses 20, 22 when the supporting frame is installed in the clarifying tank 4 as best shown in FIG. 4. A person skilled in the art would readily see that the chains 14 can be possibly replaced by endless belts or other functional equivalents. Although the term "chain" has been used herein, it should not be taken in a restrictive or literal sense.

The chains 14 can be hanged under the supporting frame so that they run about sets of front and rear opposite sprocket wheels 28, 30 mounted on plates 32 attached to the structural members 8 of the supporting frame using clamps 34 or other fasteners. With the clamps 34, the plates 32 can be slid forward or back over the members 8 for positioning purposes.

Figure 6:
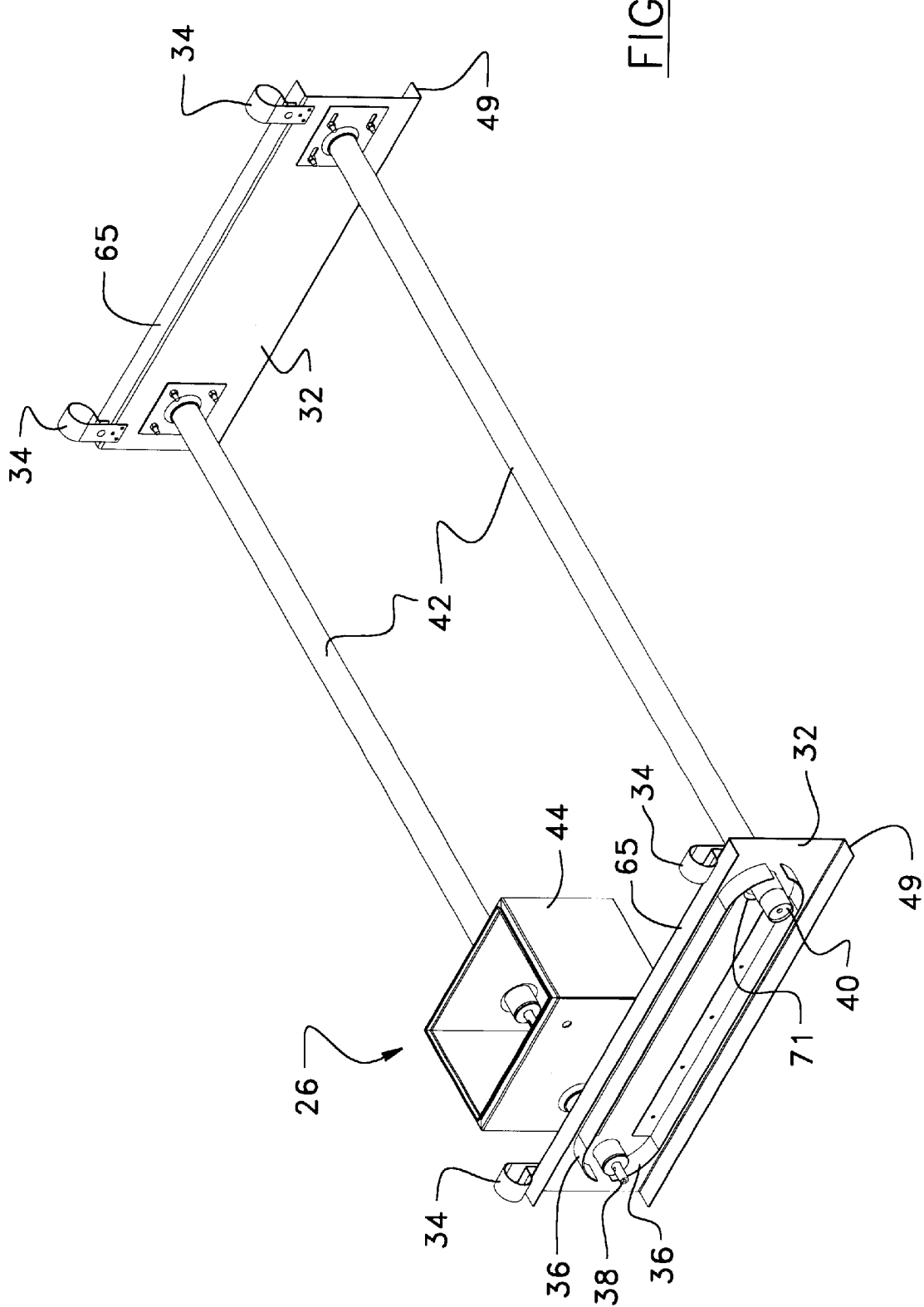
FIG. 6 is a perspective view of a self-supporting and adjustable assembly of a scum sweeper according to the invention, without the chain and motor components.

Referring to FIG. 6, upper and lower inner guiding blades 36 extending between the front and rear sprocket wheels 28, 30 of each set are preferably provided on an inner side of the chains 14, to prevent undesired bending of the chains 14 along their courses. The guiding blades 36 can be secured onto the plates 32.

A motor unit 26 is attached to the supporting frame, e.g. through one of the plates 32 in the illustrated case, and is operatively coupled to the chains 14 in a driving engagement therewith. For this purpose, the sets of front and rear opposite sprocket wheels 28, 30 (as shown in FIG. 1) can be mounted on common front and rear shafts 38, 40 supported by the plates 32 hanged to the supporting frame, with one of the shafts 38, 40 being coupled to the motor unit 26, for example the shaft 38 in the illustrated case. The shafts 38, 40 can be mounted inside protective cylindrical sheaths 42 if desired. The plates 32 may have rear inclined slots 71 through which the rear shaft 40 extends and can be adjustably positioned to stretch the chains 14. The motor unit 26 may include a gearbox (not illustrated) and be protected inside a sealed enclosure 44. The motor unit 26 can be conveniently mounted between the chains 14, so that it does not take any additional space. Such a feature is particularly useful when the available space in the clarifying tank 4 is limited.

Referring to FIG. 1, a pair of arms 46 are provided for hanging an elongated sweeping blade 48 under the chains 14 with the blade 48 extending generally crosswise to the chains 14. The arms 46 having lower ends attached to the blade 48, and upper ends pivotally attached respectively to the chains 14 at similar positions therealong, for proper alignment of the blade 48. As a result of the pivotal attachment of the arms 46 to the chains 14 and thus the free pivoting of the arms 46 at the opposite turning end courses 20, 22 (see FIGS. 4 and 5), the weight of the blade 48 will maintain it in a downwardly hanging state, under the chains. The arms 46 must therefore have a length exceeding a space between the lower and upper running courses defined by the chains 14. The arms 46 preferably have an adjustable height, e.g. through a telescopic arrangement, for adaptation to different water levels or tank installations.

As the arms 46 are pivotally attached to the chains 14, guiding arrangements must be provided for locking the arms 46 in a downward direction with respect to the chains 14 when the arms 46 travel along the lower running course 16 of the chains 14. Otherwise, the blade 48 would likely swivel back and raise, which would impair the desired surface sweeping action.

Referring to FIGS. 4 and 10, the guiding arrangements may be formed of guiding blades 48 extending along the lower running course of the chains 14, and shoes 50 projecting perpendicularly or almost perpendicularly from the arms 46 and sliding against the guiding blades 48 when the arms 46 travel along the lower running course 16 of the chains 14. The shoes 50 can be secured fixedly to the arms 46. In this case, it might be preferable to use resilient arms 46 so as to allow the arms 46 to bend slightly backward should the blade 48 hit something hard.

Alternatively, the shoes 50 may be pivotally attached to the arms 46. In this case, a spring arrangement 52 may be provided between the shoes 50 and the arms 46 respectively, for urging the arms 46 in a position perpendicular to the shoes 50. For this purpose, referring to FIGS. 7–10, the shoes 50 may have respectively side projecting shafts 54 rotatably mounted across links 56 of the chains 14 and extending beyond opposite sides of the links 56. The upper end of the arms 46 is rotatably mounted on the shafts 54 on the sides of the links 56 opposite to the shoes 50. Levers 58 project from the shafts 54 and extend in parallel with the shoes 50 on the opposite sides of the links 56 and beyond a front side of the arms 46. Stops 62 extend below a rotation point of the arms 46 on the shafts 54 and in front of the arms 46, to prevent forward pivotal of the arms 46 past a vertical line. Return springs 64 extend respectively between the levers 58 and the arms 46 and exert actions urging the arms 46 against the stops 62.

Referring to FIG. 4, guiding arrangements are preferably provided for locking the arms 46 in a downward direction with respect to the chains 14 when the arms 46 also travel along the upper running course 16 of the chains 14, to prevent the swivelling of the arms 46 when returning back along the upper running course 16, and thus undesired possible contacts of the sweeping blade 48 with the lower chain segment. These guiding arrangements can be simply formed of guiding blades 65 extending along the upper running course 18 of the chains 14, against which the shoes 50 slide during their passage.

Referring to FIG. 6, the guiding blades 48, 65 may conveniently be provided by longitudinal upper and lower side flanges projecting from the plates 32 on outer sides of the chains 14. The inner blades 36 combined with the outer blades 48, 65 thus conveniently define guiding channels for the shoes 50.

Referring to FIG. 4, in operation, the sweeping blade 48 is hauled by the running chains 14 to successively travel, as depicted by the loop 66, across the surface of the water in the tank 4 to catch scum 2 and bring it to the collector channel 6 where the blade 48 is then lifted out of the water and moved back above the water level to be later lowered again for a next sweeping pass across the surface of water. As the blade 48 moves back under the chains 14 and other components of the scum sweeper, any dripping simply falls back in the tank 4 without soiling the scum sweeper, which results in requiring less maintenance and reduces the risk of ending up with the chains 14 all clogged up. Furthermore, it allows to use a single sweeping blade 48 that covers a wide area in the tank 4 instead of requiring a set of separate blades aligned with one another. To improve the incoming of the scum 2 into the collector channel 6, the collector channel 6 can be rotatably mounted in the tank 4 and synchronized as the blade 48 is hauled near it so that the opening 68 of the channel 6 is turned toward the blade 48 and then turned away when the blade 48 has finished the sweeping action and returns back over the water level for a next sweeping operation. The height of the arms 46 supporting the blade 48 should preferably be adjusted so that the blade 48 has a good immerged portion for catching the floating scum 2. Attention should also preferably be given to the height level of the blade 48 when returning back over the water level in order to prevent the blade 48 from touching the floating scum 2.

Referring to FIG. 5, the collector channel 6 can instead be provided with an inclined ramp 70 downwardly extending from the opening 68 of the collector channel 6 toward the blade 48 and below the level of the blade 48 so that it slides on the ramp 70 when it reaches the collector channel 6 with the arms 46 slightly pivoting rearwards to follow the rising course of the ramp 70.

Figure 3:
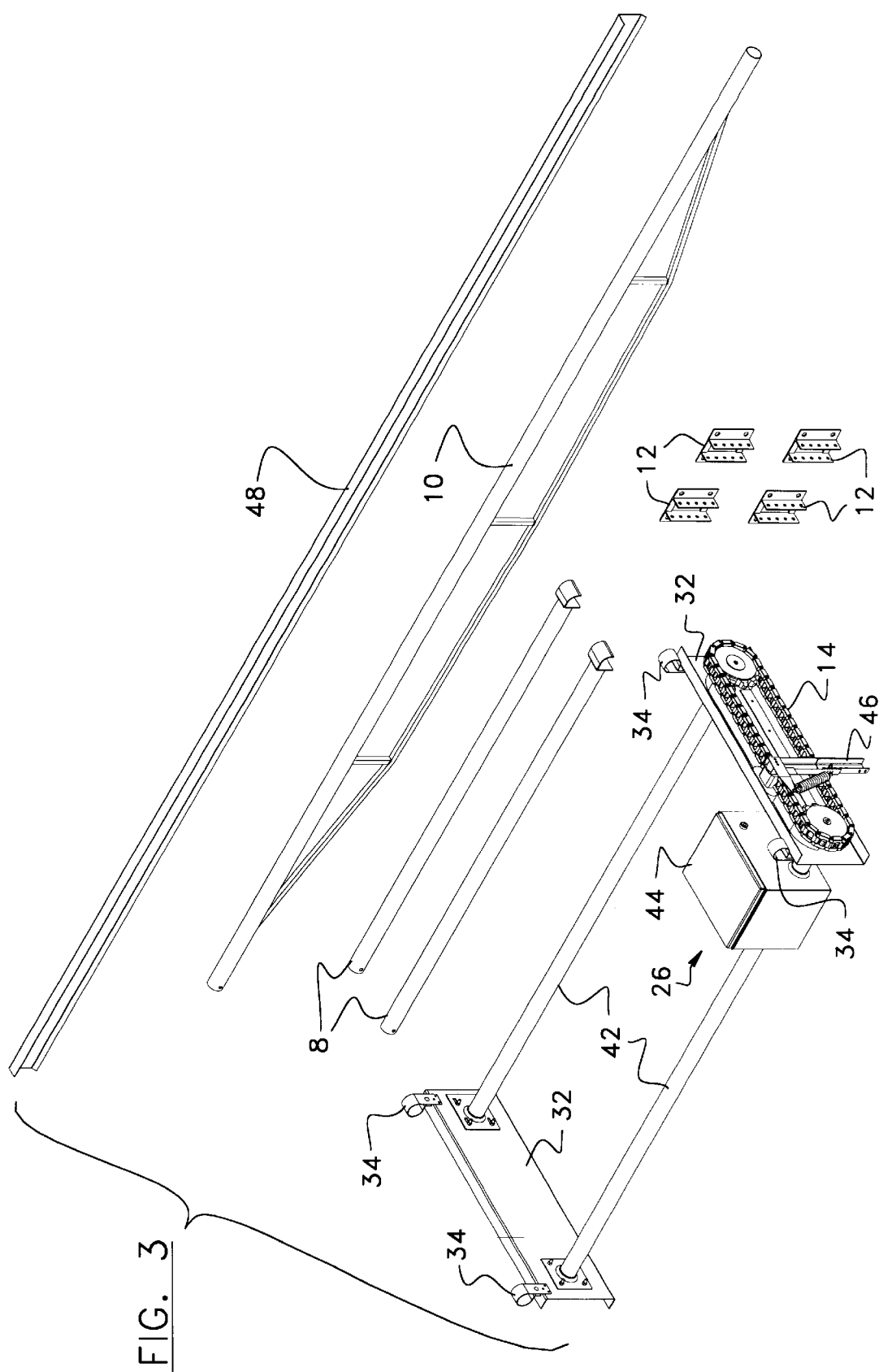
FIG. 3 is a perspective view of the non-assembled components of a scum sweeper according to the invention, for example for shipping.

Referring to FIG. 3, the components of the scum sweeper according to the invention are shown in an unassembled configuration, for example for shipping purposes.

Referring to FIG. 11, the scum sweeper may be mounted to the ceiling wall of the clarifying tank 4, thereby totally integrating with the tank 4.

While embodiments of this invention have been illustrated in the accompanying drawings and described above, it will be evident to those skilled in the art that changes and modifications may be made therein without departing from the essence of this invention. All such modifications or variations are believed to be within the scope of the invention as defined by the claims appended hereto.

What is claimed is:

1. A scum sweeper for sweeping surface floating matters in a clarifying tank to a collector channel, comprising:
    a supporting frame having mounting brackets for installation of the supporting frame in the clarifying tank at an above position with respect to the collector channel;
    a pair of endless chains attached to the supporting frame in parallel with and spaced from each other, the chains extending substantially crosswise to the collector channel and defining lower and upper opposite running courses between opposite turning end courses when the supporting frame is installed in the clarifying tank;
    a motor unit attached to the supporting frame and operatively coupled to the chains in a driving engagement therewith;
    an elongated sweeping blade;
    a pair of arms hanging the blade under the chains with the blade extending substantially crosswise to the chains, the arms having lower ends attached to the blade, and upper ends pivotally attached respectively to the chains at substantially similar positions therealong, the arms having a length exceeding a space between the lower and upper running courses; and
    a guiding means for locking the arms in a downward direction with respect to the chains when the arms travel along the lower running course thereof,
        whereby the blade always remains under the chains as a result of a free pivoting of the arms at the opposite turning end courses.

2. The scum sweeper according to claim 1, wherein the guiding means comprises:
    guiding blades extending along the lower running course of the chains; and
    shoes projecting substantially perpendicularly from the arms and sliding against the guiding blades when the arms travel along the lower course of the chains.

3. The scum sweeper according to claim 2, wherein the guiding means further comprises spring means connected between the shoes and the arms respectively, for urging the arms in a position perpendicular to the shoes.

4. The scum sweeper according to claim 3, wherein:
    the shoes have respectively side projecting shafts rotatably mounted across links of the chains and extending beyond opposite sides of the links, the upper end of the arms being rotatably mounted on the shafts on the opposite sides of the links;
    the guiding means further comprises levers projecting from the shafts and extending in parallel with the shoes on the opposite sides of the links and beyond a front side of the arms, and stops extending below a rotation point of the arms on the shafts and in front of the arms; and
    the spring means comprise return springs extending respectively between the levers and the arms and exerting actions urging the arms against the stops.

5. The scum sweeper according to claim 1, further comprising an additional guiding means for locking the arms in a downward direction with respect to the chains when the arms travel along the upper running course thereof.

6. The scum sweeper according to claim 5, wherein the guiding means comprise together:
    guiding blades extending along the lower and upper running courses of the chains; and
    shoes projecting substantially perpendicularly from the arms and sliding against the guiding blades when the arms travel successively along the lower and upper courses of the chains.

7. The scum sweeper according to claim 6, wherein the chains run about sets of front and rear opposite sprocket wheels mounted on plates attached to structural members of the supporting frame, the guiding blades being provided by longitudinal upper and lower side flanges projecting from the plates on outer sides of the chains, the plates being provided with projecting inner guiding blades extending between the front and rear sprocket wheels of each set on an inner side of the chains.

8. The scum sweeper according to claim 1, wherein the arms have an adjustable height.

9. The scum sweeper according to claim 1, wherein the motor unit is mounted between the chains.

10. The scum sweeper according to claim 9, wherein the motor unit is provided with a sealed enclosure.

11. The scum sweeper according to claim 9, wherein the chains run about sets of front and rear opposite sprocket wheels mounted on common front and rear shafts supported by the supporting frame, one of the shafts being coupled to the motor unit.

12. The scum sweeper according to claim 1, wherein the supporting frame comprises a pair of elongated structural members detachably supporting respectively the chains, and a structural beam member extending crosswise at an end of the structural members.

13. A scum sweeping system comprising:

a clarifying tank;

a collector channel extending in the clarifying tank at a predetermined level therein, the collector channel having an elongated longitudinal upper opening; and a scum sweeper comprising:

a supporting frame having mounting brackets securing the supporting frame to the clarifying tank at an above position with respect to the collector channel;

a pair of endless chains attached to the supporting frame in parallel with and spaced from each other, the chains extending substantially crosswise to the collector channel and defining lower and upper opposite running courses between opposite turning end courses, one of the turning end courses of the chains extending above the collector channel;

a motor unit attached to the supporting frame and operatively coupled to the chains in a driving engagement therewith;

an elongated sweeping blade;

a pair of arms hanging the blade under the chains with the blade extending substantially crosswise to the chains and at a level similar to the level of the collector channel, the arms having lower ends attached to the blade, and upper ends pivotally attached respectively to the chains at substantially similar positions therealong, the arms having a length exceeding a space between the lower and upper running courses; and a guiding means for locking the arms in a downward direction with respect to the chains when the arms travel along the lower running course thereof, whereby the blade always remains under the chains as a result of a free pivoting of the arms at the opposite turning end courses.

14. The scum sweeping system according to claim 13, wherein the collector channel is provided with an inclined ramp downwardly extending from the opening of the collector channel toward the blade and below the level of the blade.

15. The scum sweeping system according to claim 13, wherein the collector channel is rotatably mounted in the tank.

16. The scum sweeping system according to claim 13, wherein the clarifying tank has a ceiling wall receiving the supporting frame of the scum sweeper.

17. The scum sweeping system according to claim 13, wherein the scum sweeper further comprises an additional guiding means for locking the arms in a downward direction with respect to the chains when the arms travel along the upper running course thereof.

* * * * *